(12) United States Patent
Bonnel et al.

(10) Patent No.: US 6,208,786 B1
(45) Date of Patent: Mar. 27, 2001

(54) METHOD OF MANUFACTURING ARRAYS OF MONOMODE FIBERS

(75) Inventors: Léon Bonnel, St Quay-Perros; Georges Audibert, Pleumeur-Bodou; Philippe Gravey, Lannion, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/236,907

(22) Filed: Jan. 22, 1999

(30) Foreign Application Priority Data

Jan. 27, 1998 (FR) .................................................. 98 00844

(51) Int. Cl.⁷ ................................. G02B 6/04; G02B 6/44
(52) U.S. Cl. ............................................. 385/115; 385/114
(58) Field of Search ..................................... 385/114, 115

(56) References Cited

U.S. PATENT DOCUMENTS

| | | | |
|---|---|---|---|
| 2,992,956 | 7/1961 | Bazinet ................................. | 154/90 |
| 3,626,040 | * 12/1971 | Nagao et al. ............................. | 264/1 |
| 4,859,012 | * 8/1989 | Cohn ................................. | 350/96.24 |

FOREIGN PATENT DOCUMENTS

| | | |
|---|---|---|
| 1333099 | 10/1973 | (GB) . |
| 1223112 | 8/1966 | (NL) . |

OTHER PUBLICATIONS

Patent Abstracts of Japan vol. 096, No. 012, Dec. 26, 1996 and JP 08 220382 A Aug. 30, 1996.

\* cited by examiner

*Primary Examiner*—Frank G. Font
*Assistant Examiner*—Michael P. Stafira
(74) *Attorney, Agent, or Firm*—Blakely Sokoloff Taylor & Zafman

(57) ABSTRACT

The method of manufacturing optical fiber arrays comprises the steps consisting in:
  placing optical fibers in an enclosure in the form of a deformable parallelogram, the fibers being in an array of rows and of columns that are at an angle relative to the rows; and
  deforming the enclosure so as to vary the angle.

16 Claims, 2 Drawing Sheets

METHOD OF MANUFACTURING ARRAYS OF MONOMODE FIBERS

BACKGROUND OF THE INVENTION

I. Field of the Invention

The present invention relates to manufacturing arrays of optical fibers, in particular monomode fibers.

II. Description of the Related Art

The availability of arrays of monomode optical fibers represents a major factor in developing optical technologies and in making them widespread, essentially in the following two fields: firstly optical switching and cross-connection systems using high interconnection density in free space; and secondly motherboard links and integrating components with arrays of fibers. Monomode fiber arrays are key components that are essential for these two fields of activity and that perform the following functions:

- inlet and outlet ports for free space optical switches and cross-connection fields;
- making arrays of collimated beams in association with arrays of microlenses;
- making high density 2D connectors for optical buses; and
- coupling arrays of vertical cavity surface emitting lasers (VCSELs) with monomode fiber arrays.

Interconnecting monomode fibers with the required specifications, i.e. positioning accuracy of $\mu$m order between fibers, can be achieved for fibers presented in the form of strips. The fibers are placed in respective V-grooves etched in a silicon substrate or machined in a glass or zirconium support. Commercial products are presently available.

Nevertheless, when it comes to interconnecting arrays of fibers, manufacture remains difficult and certain problems have not yet been solved. The solution of stacking strips cannot be used because of the impossibility of controlling the thickness of such strips with $\mu$m order accuracy.

Two lines are presently being investigated. The first lies in using a piezoelectric micropositioner to position fibers dynamically in an array of holes that can be made using various methods such as etching a silicon substrate, precision drilling, or ablating metal by means of a laser. Nevertheless, that technique which consists in individually and dynamically aligning and sticking fibers in an array of holes is difficult, lengthy, and very expensive. Furthermore, it does not provide sufficient guarantee that the fibers will be properly positioned angularly in the support so that the axes of the fibers are exactly parallel. The precision with which the fibers are positioned is determined by the regularity of the pitch and the diameter of the holes in the array, and also by the performance of the micropositioner. On this topic, reference can be made in particular to the following documents:

A) N. Basavanhally et al., "Evaluation of fiber arrays for free space interconnect applications", International Topical Meeting on Optical Computing, Salt Lake City, Utah, U.S.A., Mar. 15–17, 1995, Vol. 12, PFB2-1, pp. 124–128;

B) Geoff M. Proudley, C. Stace, H. White, "Fabrication of two-dimensional fiber optic arrays for an optical crossbar switch", Optical Engineering, February 1994, Vol. 33, No. 2, pp. 627–635;

C) J. M. Sassian et al., "Fabrication of fiber bundle arrays for free-space photonic switching systems", Optical Engineering, September 1994, Vol. 33, NO. 9, pp. 2979–2985.

In a second technique, fibers that are bare or that are positioned in microferrules are stacked in a U-shaped support. That technique, which consists in stacking fiber-containing ferrules in a rigid U-shaped frame structure, constitutes a collective assembly method which gives good angular positioning, but which suffers from poor perpendicularity in the array of ferrules, and therefore from excessive positioning errors relative to a reference grid for fibers situated in the corners. Reference can be made in particular to document D) K. Koyabu, F. Ohira, T. Yamamoto, "Fabrication of two-dimensional PANDA fiber array digital free-space photonic switch module", International Topical Meeting on Optical Computing, Sandai, Japan, Apr. 21–25, 1996, Technical Digest Vol. 1, PWC26, pp. 136–137.

BRIEF SUMMARY OF THE INVENTION

An object of the invention is to provide a method of manufacturing fiber arrays that is simple, fast, and inexpensive to implement, and that makes it possible to manufacture a fiber array having rows and columns that are accurately perpendicular, together with good parallelism between the axes of the fibers.

In order to achieve this object, the invention provides a method of manufacturing optical fiber arrays, the method comprising the step consisting in:

placing optical fibers in an enclosure in the form of a deformable parallelogram, the fibers being in an array of rows and of columns that are at an angle relative to the rows; and deforming the enclosure so as to vary the angle.

Thus, the method makes it possible to optimize the perpendicularity of the sides of the array. The method of the invention makes it possible to make fiber arrays in which the position of each fiber core is less than ±2.5 $\mu$m relative to a predetermined grid as a function of the selected pitch, and to provide angular misalignment that does not exceed ±5 milliradians. These tolerances make it possible to obtain coupling losses between monomode fibers that are less than 3 dB. By means of this method, it becomes extremely simple to make arrays of fibers, and in particular monomode fibers. The adjustment is collective and is performed merely by observation.

The juxtaposition and stacking method is validated by relying on the fact that during assembly, the fibers, and for example the ferrules, are placed in random manner. Equilibrium is thus produced in the distribution between the ferrules which have a maximum diameter and those which have a minimum diameter. Thus, each fiber core is located at a position that is very close to the grid defined as a function of the pitch. A simulation on five thousand reconfigurations of an 8×8 array (sixty-four fibers) has verified this analysis. Under the least favorable assembly conditions, the mean error relative to a reference grid is only 2.06 $\mu$m.

Advantageously, the method includes the step of fixing the fibers to one another.

Advantageously, the fixing step comprises molding by means of a resin.

Advantageously, the method includes the step of pressing the array in at least one direction selected from the row direction and the column direction.

Thus, in addition to adjusting perpendicularity, the dimensions of the array are also adjusted.

The invention also provides a device for manufacturing optical fiber arrays, the device having four faces defining an enclosure suitable for receiving optical fibers disposed in an array, the faces giving the enclosure the shape of a parallelogram with non-parallel faces forming an angle between one another, wherein the enclosure is deformable so as to vary the angle.

This device can be used to implement the method of the invention.

Advantageously, the device includes means for adjusting the angle.

Advantageously, the device includes two elements forming two mutually parallel faces of the enclosure, a frame structure, and at least one actuator movable relative to the frame structure and connected to the elements so that displacing the actuator causes the angle to vary.

The actuator makes it possible to modify the perpendicularity of the parallelogram accurately.

Advantageously, the actuator is hinged to the frame structure.

Advantageously, the actuator is hinged by means of a flexible portion.

Advantageously, the device has two actuators connected to two respective elements and interconnected to each other.

Advantageously, the device includes adjustment means for adjusting the distance between mutually parallel faces of the enclosure.

Advantageously, the adjustment means comprise a drive member, a pusher for pushing one of the faces under the effect of urging from the drive member, and a ball interposed between the drive member and the pusher.

This prevents rotation being applied to the array at the same time as force is applied thereto for the purpose of adjusting its size.

Advantageously, the device includes zirconium elements forming the faces.

Advantageously, the elements comprise blocks.

The invention also provides an array of optical fibers manufactured by means of the method of the invention.

The invention is particularly advantageous for arrays of monomode fibers.

BRIEF DESCRIPTION OF THE DRAWINGS

Other characteristics and advantages of the invention appear further from the following description of a preferred embodiment given by way of non-limiting example. In the accompanying drawings.

DETAILED DESCRIPTION OF THE INVENTION

Figure 1:
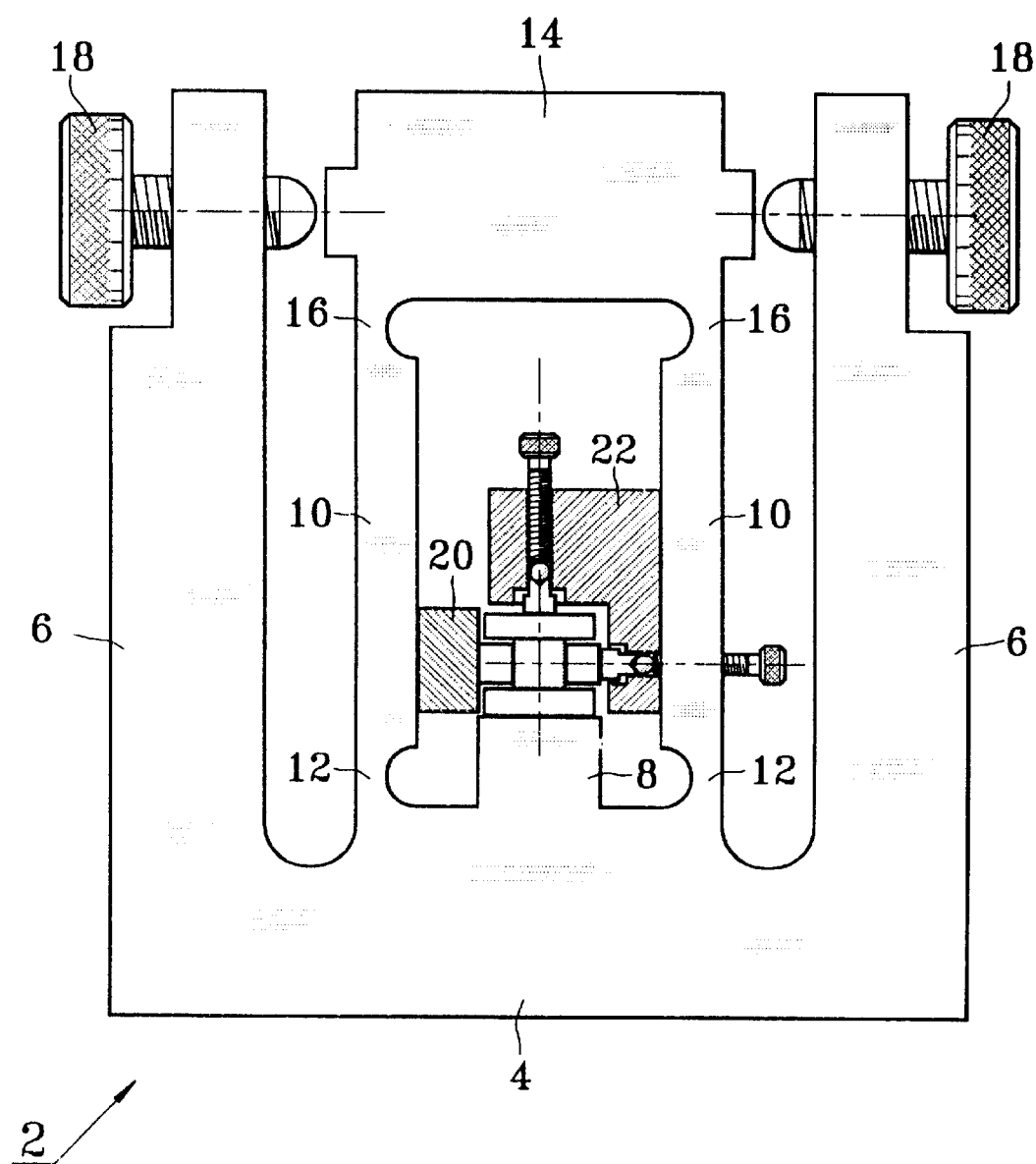
FIG. 1 is an elevation view of a manufacturing device constituting a preferred embodiment of the invention.
Figure 2:
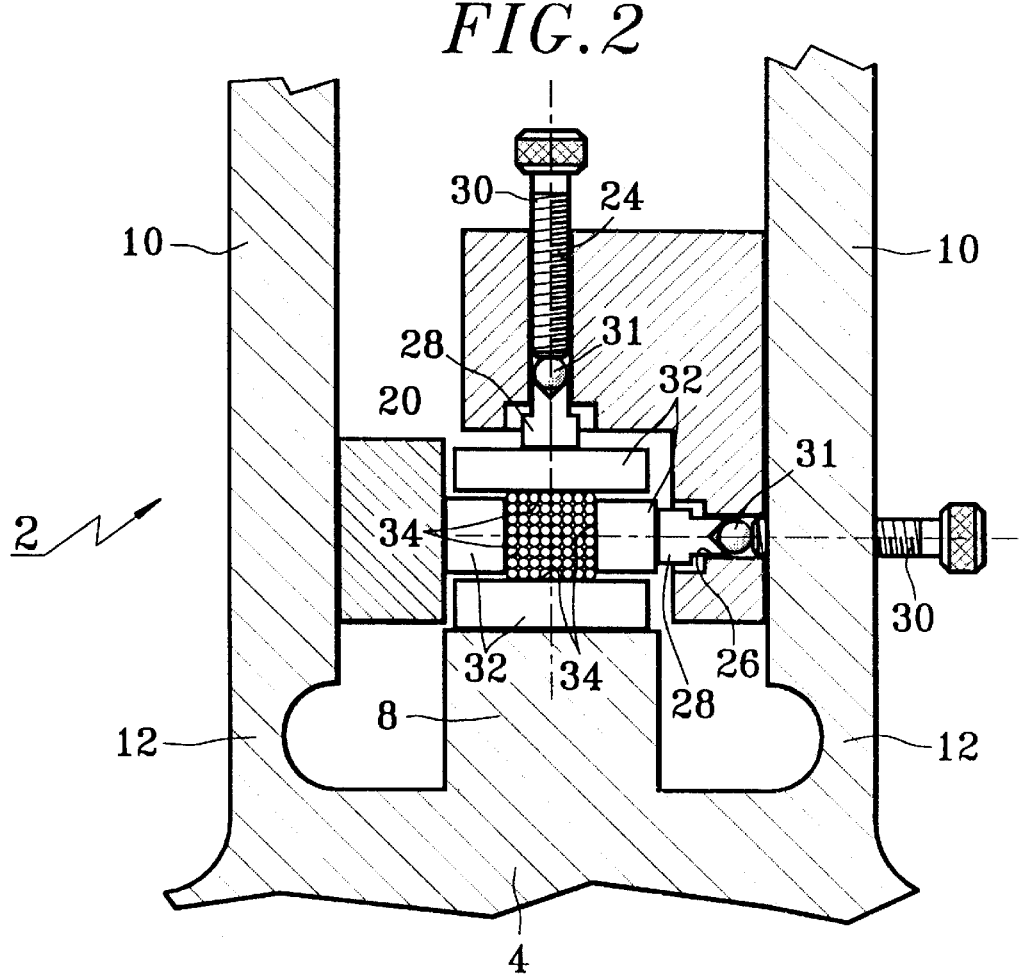
FIG. 2 is a view on a larger scale showing a detail of FIG. 1.
Figure 3:
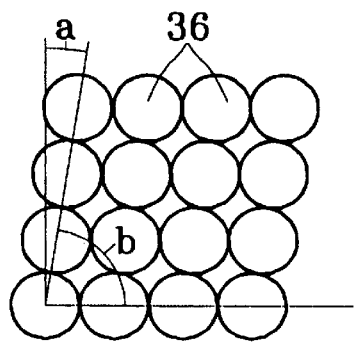
FIG. 3 is a cross-section through an array of fibers having a large perpendicularity error.

FIGS. 1 and 2 show a preferred embodiment of a device of the invention for manufacturing arrays of monomode optical fibers. The device comprises a frame structure 2 having a base 4 which is horizontal in this case and two uprights which are vertical in this case, comprising left and right uprights 6 that face each other and that are perpendicular to the base 4. The frame structure also has a support 8 fixed to the base 4 halfway between the uprights.

The device has two vertical rectilinear beams 10 of rectangular section that are identical to each other and that extend via respective bottom ends 12 from the base 4 parallel to the uprights 6 and between them. The device has a top arm 14 connected to the top ends 16 of the beams 10. The bottom ends 12 and the top ends 16 of the beams 10 are of reduced thickness so as to constitute elastically bendable hinges. The base 4, the top arm 14, and the beams 10 are disposed so as to constitute a deformable parallelogram. The device has two micrometer screws 18 screw-mounted to the top ends of the respective uprights 6 so that the free ends of the screws 18 point towards each other and are adapted to bear against respective left and right ends of the top arm 14 for the purpose of moving it to left or to right, thereby deforming the parallelogram.

The device has a left spacer 20 fixed to an inside right face of the left beam 10, and a top right spacer 22 fixed to the left inside face of the right beam 10. The spacer 22 has a threaded vertical through duct 24 opening out towards the support 8, and a threaded horizontal through duct 26 opening out towards the left spacer 20. The duct 26 is extended by a smooth duct passing through the right beam 10. In each of the two ducts 24 and 26 of the spacer 22, the device has a respective pusher 28 having a smooth external face, the pusher being engaged in the duct, and each duct has a respective drive member 30 having a threaded face engaged in the thread of the associated duct. The drive member 30 of the horizontal duct 26 is also engaged in the duct through the right beam 10. In each of the ducts 24 and 26, a ball 31 is interposed between the pusher 28 and the associated drive member 30. A proximal end of the pusher 28 forming a seat for the ball 31 is of conical female shape.

To implement the method of the invention, four zirconium blocks 32 in the form of rectangular parallelepipeds are also used. These four blocks 32 are placed with the four free faces 34 of the blocks 32 facing one another so that these faces form an enclosure whose outline is in the form of a parallelogram, i.e. the enclosure is parallelepipedal in shape. The bottom block rests on the support 8, the left block presses against the left spacer 20, while the top and right blocks press against the distal ends of the respective pushers 28.

Monomode optical fibers 36 each provided with a respective zirconium ferrule at its end are placed in the enclosure to form an array that is of generally rectangular shape, being made up of rows and of columns that form an angle a relative to the vertical and an angle b relative to the rows. The ferrules are generally in contact with one another. The four side faces of the array are in contact with the four faces 34 of the enclosure.

To adjust the dimensions of the array, the drive member(s) 30 is/are actuated to advance the pusher(s) 28 towards the array. The array is thus compressed vertically along the columns between the top block and the bottom block, and/or horizontally along the rows between the left block and the right block. Where appropriate, this compression puts ferrules into contact that were not initially in contact.

Figure 4:
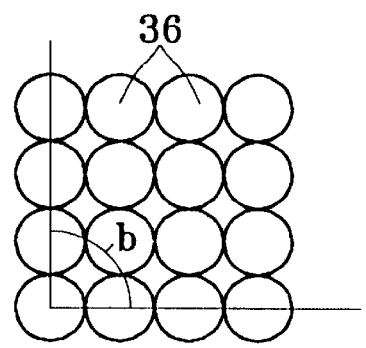
FIG. 4 is a view of the FIG. 3 array after the error has been corrected.

At this stage, the angle b which measures the perpendicularity of the array, is generally not equal to 90°. By using the micrometer screws 18, the beams 10 are caused to pivot about their bottom ends 12 to left or to right so as to modify the angle of the beams relative to the base 4, with the two beams 10 continuing to form a parallelogram. This change in position is transferred to the array of fibers via the spacers 20 and 22, the right pusher 28, and the left and right blocks 32. Changing the position of the beams 10 deforms the parallelogram profile of the enclosure, thereby varying the angles a and b of the array. It is thus possible to adjust the angle b so that it comes as close as possible to a value that is equal to 90°, as shown in FIG. 4.

When the angle b of the array and the dimensions of the array have been appropriately adjusted, a molding resin is injected into the enclosure and the array so as to be molded around the array and hold the ferrules relative to one another.

The ferrules and the blocks are made of zirconium using very small manufacturing tolerances, however these tolerances are entirely compatible with industrial know-how. For the ferrules, these tolerances are 0.5 µm on outside diameter and 1 µm on inside diameter, and the inside and outside diameters are concentric to within less than 1 µm. The blocks 32 are plane to within less than 0.1 µm.

By using beams 10 that are connected to the base 4 via flexible links 12, problems associated with play in the operation of mechanical parts is eliminated. The device enables the perpendicularity b to be adjusted with definition of 0.1 milliradians.

An 8×8 array (64 fibers) has been made using the above method. The results were as expected. The mean error relative to a reference grid was 1.04 µm, the maximum error was 2.55 µm, and the typical error was 0.58 µm. Experience gained in making that array (and also a strip of sixteen fibers with a maximum error of 1 µm relative to exact positioning) makes it possible to envisage making arrays of larger dimensions.

This method of collective assembly is simple, thereby making it possible to achieve manufacturing cost that is very low. A priori, there is no limit on the number of fibers that can be used for making such arrays.

What is claimed is:

1. A method of manufacturing optical fiber arrays (36), the method being characterized in that it comprises the steps consisting in:
    placing optical fibers (36) in an enclosure in the form of a deformable parallelogram, the fibers being in an array of rows and of columns that are at an angle (b) relative to the rows; and
    deforming the enclosure so as to vary the angle (b).

2. A method of manufacture according to claim 1, characterized in that it includes the step of fixing the fibers (36) to one another.

3. A manufacturing method according to claim 2, characterized in that the fixing step comprises molding by means of a resin.

4. A method of manufacture according to claim 1, characterized in that it includes the step of pressing the array in at least one direction selected from the row direction and the column direction.

5. A device for manufacturing optical fiber arrays, the device having four faces (34) defining an enclosure suitable for receiving optical fibers (36) disposed in an array, the faces (34) giving the enclosure the shape of a parallelogram with non-parallel faces (34) forming an angle (b) between one another, the device being characterized in that the enclosure is deformable so as to vary the angle (b).

6. A device according to claim 5, characterized in that it includes means (10, 14, 18) for adjusting the angle (b).

7. A device according to claim 5 or 6, characterized in that it includes two elements (32) forming two mutually parallel faces (34) of the enclosure, a frame structure (4), and at least one actuator (10) movable relative to the frame structure and connected to the elements (32) so that displacing the actuator (10) causes the angle (b) to vary.

8. A device according to claim 7, characterized in that the actuator (10) is hinged to the frame structure (4).

9. A device according to claim 8, characterized in that the actuator (10) is hinged by means of a flexible portion (12).

10. A device according to any one of claims 7 to 9, characterized in that it has two actuators (10) connected to two respective elements (32) and interconnected to each other.

11. A device according to any one of claims 5 to 10, characterized in that it includes adjustment means (28, 30, 31) for adjusting the distance between mutually parallel faces (34) of the enclosure.

12. A device according to claim 11, characterized in that the adjustment means comprise a drive member (30), a pusher (29) for pushing one of the faces (34) under the effect of urging from the drive member, and a ball (31) interposed between the drive member and the pusher.

13. A device according to any one of claims 5 to 12, characterized in that it includes zirconium elements (32) forming the faces (34).

14. A device according to claim 13, characterized in that the elements (32) comprise blocks.

15. An optical fiber array (36), characterized in that it is manufactured by means of a method according to any one of claims 1 to 4.

16. An array according to claim 15, characterized in that the fibers (36) are monomode fibers.

* * * * *